Feb. 12, 1957  J. D. WARHUS  2,781,058
FLOW CONTROL DEVICE
Filed Sept. 6, 1951
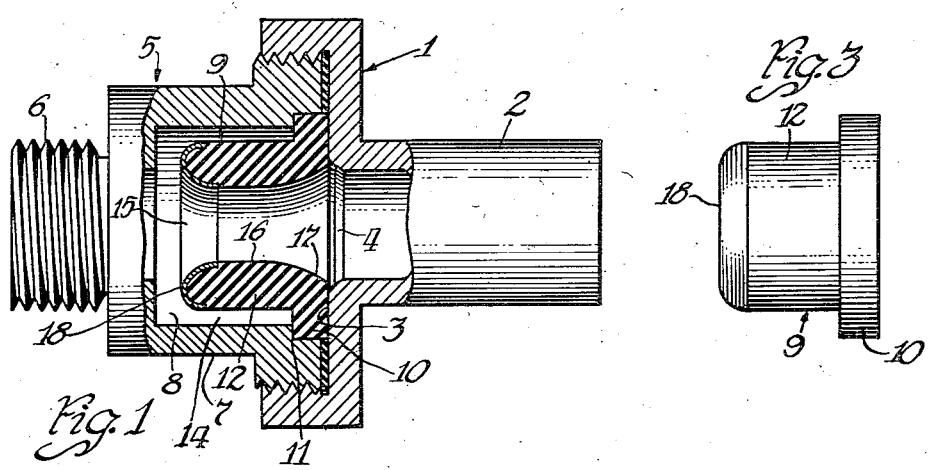
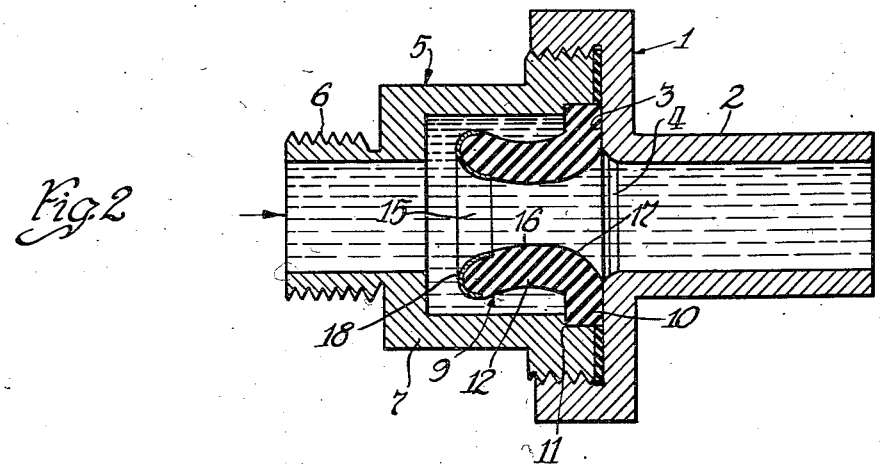
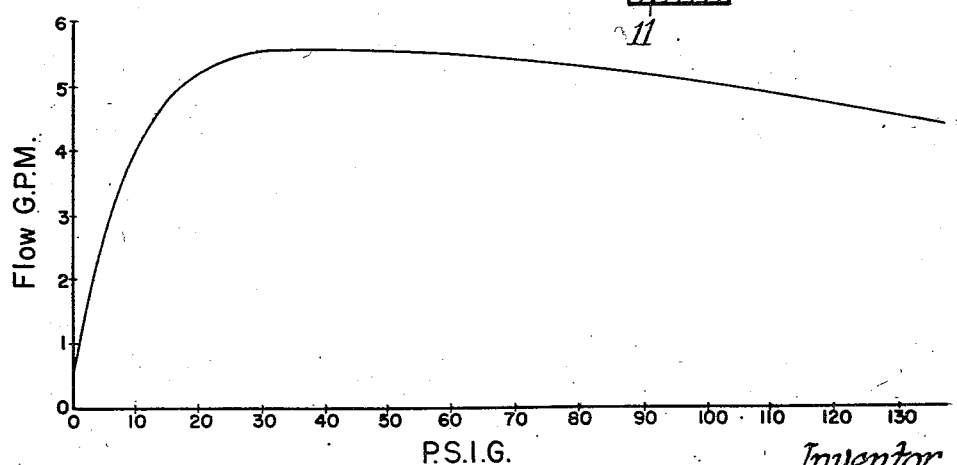
Inventor
John D. Warhus
by Andrew S. Hubbard
Atty.

United States Patent Office 2,781,058
Patented Feb. 12, 1957

2,781,058

FLOW CONTROL DEVICE

John D. Warhus, Lombard, Ill., assignor to General Electric Company, a corporation of New York Application September 6, 1951, Serial No. 245,289

5 Claims. (Cl. 138—45)

This invention relates to devices for installation in a fluid conduit to maintain a substantially constant rate of flow irrespective of variations in the fluid pressure drop across the device.

It is a principal object of my invention to provide an improved flow control device which will maintain a preselected rate of flow within relatively close limits over a wide range of pressure drops across the device.

It is another object of the invention to provide a flow control device having an axial flow passage which automatically increases or decreases in flow capacity in response to the pressure differential between the static head of fluid about the device and the velocity head of fluid within said passage.

It is yet another object of the invention to provide a flow control device in which the operating element will maintain its designed flow control characteristics over a long operating life.

A preferred embodiment of the invention contemplates a casing having inflow and outflow passages for connection to the fluid conduits within which the flow rate is to be controlled. Suitably supported within an enlarged body portion of the casing and in spaced relation with the inner wall thereof, is a flexible cylinder of rubber or other elastomeric material. The cylinder has an axial bore providing a substantially Venturi-shaped passage coaxial with the inlet and outlet passages of the casing. Under fluid flow conditions, the side wall of the cylinder is subject to the pressure differential between the velocity head of fluid passing through the cylinder and the static head of the fluid within the annular space defined by the outer wall of the cylinder and the inner wall of the casing. Upon the attainment of a pressure differential sufficient to overcome the inherent resistance to flexure of the cylinder wall, the cylinder will flex inwardly, with corresponding contraction of the flow passage and reduction of the rate of flow therethrough. A flow control device constructed pursuant to this invention appears to be subject to less structural strains and physical deformation in operation than the presently popular control devices which rely upon the flexure of an annular disc to contract the upstream side of a relatively sharp edged orifice and expand the downstream face thereof, and therefore should have a longer useful life than annular disc types of comparable quality of material and workmanship.

Other features and advantages of the invention will appear in the following detailed description, read together with the accompanying drawings in which:

Fig. 1 is a side elevation of a flow control device embodying my invention, partially in section to show the flow responsive element under a condition of rest in which the element is subject only to static pressure.

Fig. 2 is a side sectional elevation of the device, indicating a typical response of the flow control element to the pressure differential between the static head about the element and the velocity head of fluid flowing therethrough.

Fig. 3 is a side elevation of the flow control element; and

Fig. 4 is a performance curve based on actual test data showing the flow rate in gallons per minute over a large range of upstream gauge pressures.

I have chosen to illustrate my invention in application to a simple flow fitting, such as might be used as part of the water supply system for a clothes washing machine in which water discharges almost directly into a wash tub and there is little or no frictional or other resistance to flow creating a back pressure on the downstream side of the device. In this connection then, the gauge pressures plotted along the ordinate of Fig. 4 are upstream pressures and may also be considered to be the actual pressure drop across the device. It will be understood, of course, that the device may be installed at any point in a fluid flow line and that the operation is not limited to the control of liquids.

Specifically, the illustrated embodiment of the invention contemplates a casing or housing comprising a base member 1 having any desired length and arrangement of discharge conduit 2 and an offset providing a shoulder 3 concentric with respect to said conduit. The entrance 4 to the discharge conduit is preferably beveled, and I consider it desirable to approximate a curving entrance by using a double angle bevel. This approaches the desired characteristics of a curved entrance with simpler manufacturing tools and tool maintenance.

The complementary casing member 5 has an inflow portion 6, threaded or otherwise arranged for attachment to a conduit, and a cylindrical sleeve 7, of relatively large diameter extending concentrically therefrom. Any suitable means for securing the casing members together may be used; I have indicated that the respective parts may be screw-threadedly secured, in which event it will be expedient to use a suitable gasket at the base of the sleeve 7, as is well understood.

The sleeve 7 cooperates with the base member 1 to provide a static pressure chamber 8 intermediate the inflow and discharge members, and within said chamber there is secured a flow control element 9 designed to maintain a predetermined flow rate by automatic adjustment to the pressure differential between the static pressure within the chamber and the velocity head of fluid flowing through the element. A presently preferred flow control element 9 is molded from resilient material. I prefer an elastomeric material such as natural rubber or synthetics such as neoprene or Buna-N, although by proper dimensioning with respect to physical characteristics, it is entirely possible to form the element from materials such as polyethylene or the polyvinyl chlorides. The selection of material for the flow control element 9, as well as for the respective casing parts, will be determined largely by the chemical nature of the fluid being handled and physical conditions of temperature and pressure. With water at the normal pressure and temperature conditions of domestic installations, I may use brass for the casing parts and Buna-N for the flow control element. Buna-N is dimensionally stable and sufficiently non-absorbent to eliminate the likelihood of swelling after long periods of immersion in water.

Specifically, the flow control element has a flanged base 10 which seats on the shoulder 3 and snugly engages the various faces of the counterbore 11 at the base of the sleeve 7. Rising from the flange 10 is a cylinder 12, which is of sufficiently smaller outside diameter as respects the inside diameter of the sleeve 7 to provide an annular space 14. The axial bore of the cylinder 12 is venturi-shaped; that is, it has an inwardly curving entrance portion 15, a brief throat 16 of uniform diameter, and a smoothly outwardly curving discharge portion 17. The bore is coaxial with the inflow and discharge conduits, as shown. The areas of the entrance portion 15 and discharge portion 17 are held uniform regardless of fluid pressure conditions. This requires stiffening or strengthening these portions of the cylinder. At the discharge 17 the flange 10 and its confinement adequately maintains the discharge area, and at the entrance it has been found expedient to apply a metal ferrule 18.

The flexible walled cylinder responds to known principles of flow through venturi tubes: as the velocity of flow increases in the throat, the pressure within the throat decreases; the static pressure about the flow control element becomes a dominant force, and as presently described, the flow capacity of the element 9 becomes automatically responsive to the pressure differential between the static head and the velocity head of the fluid at any moment.

The operation of the element becomes apparent by comparison of Figs. 1 and 2. Fig. 1 is a rest position; it illustrates the normal shape of the flow control element under a condition in which there is no fluid flow through the device and hence the pressure within the bore of the cylinder 12 is equal to that within the chamber 8. As soon as flow begins the pressure within the throat 16 becomes less than the static pressure within the chamber 8. Up to approximately 20 lbs. gauge pressure of fluid the walls of cylinder 12 resist deformation, and there is little inward deflection of the cylinder wall. The flow rate therefore increases sharply with the increasing fluid head. Between 20 and 30 lbs. per square inch gauge the rate of increase in flow drops sharply as the static head becomes sufficiently greater than the velocity head to overcome the resistance to distortion of the cylinder walls and to produce the inward flexure of the cylinder, typified by Fig. 2, thus reducing the throat area. With increasing flow velocity through the cylinder, the pressure differential increases, and it is inevitable that the rate of flow will decrease. However, by proper relation of the resilience of the material, wall thickness, and other dimensions, the flow rate may be held substantially constant through almost any desired pressure range. Fig. 4 shows, for example, that the rate of flow is within approximately one-quarter of a gallon per minute over a range of from 30 to 80 lbs. per square inch gauge pressure. Such performance is particularly desirable in washing machine installations in which water supply valves are opened for an automatically timed interval and water pressures available at the machine may range widely.

Using Buna-N of approximately 50 durometer, the following proportions per unit of outside diameter of the cylinder are illustrative of a flow control element capable of the control typified by Fig. 4.

|  | Units |
| --- | --- |
| Length overall | 0.940 |
| Thickness of flange 10 | 0.250 |
| Maximum cylinder wall thickness | 0.290 |
| Radius of upstream entrance curvature | 0.160 |
| Radius of downstream curvature | 0.750 |
| Length of cylindrical throat | 0.250 |

The total length of the cylindrical portion within which flexure actually occurs is approximately one-half of the overall length or approximately 1.6 times the maximum wall thickness. It must be noted that these relative proportions are by way of example only.

It is thought obvious from Fig. 2 that the smooth curve forms characteristic of the deformation of the flow control element 9 under even large pressure differentials insure satisfactory performance over a longer life than the conventional annular disc control elements. Being devoid of sharp-edged orifices, the abrading action of the fluid is less critical than in the annular disc types of element which under pressure transform from an essentially cylindrical orifice of finite length to a frusto-conical orifice having a sharp-edged upstream orifice.

While there has been described what is at present considered to be the preferred embodiments of the invention, it will be understood that various modifications may be made therein, and it is intended to cover in the appended claims all such modifications as fall within the true spirit and scope of the invention.

I claim:

1. A flow control device, including structure defining a casing having fluid inlet and outlet passages and a chamber upstream of said outlet passage, said chamber being of larger internal diameter than said outlet passage, a cylinder of less diameter than said chamber, flange means fixed to said cylinder and extending radially therefrom to engage with the surrounding wall of said chamber to provide an annular space about said cylinder communicating only with said inlet passage, said cylinder having an axial passage of venturi shape registering with said casing outlet passage, means for maintaining a pre-established diameter of the inlet portion of said cylinder passage, and means for maintaining a pre-established diameter of the outlet portion thereof; a relatively long body portion of said cylinder intermediate its said inlet and outlet portions and comprehending the throat portion of said venturi-shaped passage being of resilient material, whereby the area of said throat will expand or contract according to the pressure differential between the static head of fluid within said annular space and the velocity head of fluid flowing through said cylinder passage.

2. A flow control device, including structure defining fluid inlet and outlet passages and a chamber upstream of said outlet passage, said chamber being of larger internal diameter than said outlet passage and having a base wall extending about said passage to provide a shoulder, a cylinder of less diameter than said chamber disposed therein with the peripheral wall of said cylinder spaced from the inner wall of said chamber to provide an annular space communicating with said inlet passage, said cylinder having an axial passage of venturi shape communicating between said chamber and said outlet passage, means for maintaining a pre-established diameter of the inlet portion of said cylinder passage, and flange means extending radially outwardly from the discharge end of said cylinder and confined within said chamber for securing said cylinder on said shoulder and maintaining a pre-established diameter of the outlet portion of said cylinder passage; a relatively long body portion of said cylinder intermediate its ends and comprehending the throat portion of said venturi-shaped passage being of resilient material, whereby the area of said throat will expand or contract according to the pressure differential between the static head of fluid within said chamber and the velocity head of fluid flowing through said cylinder passage.

3. A flow control device, including structure defining a casing having fluid inlet and outlet passages and a chamber upstream of said outlet passage, said chamber being of larger internal diameter than said outlet passage and having a base wall defining a shoulder extending radially outward of said passage, an elastomeric cylinder of less diameter than said chamber disposed wholly within said chamber with the peripheral wall of said cylinder spaced from the inner wall of said chamber to provide a substantially uniform annular space communicating with said inlet passage, said cylinder having an axial passage of venturi shape registering with said casing inlet and outlet passages, rigid wall means at the top of said cylinder defining a smoothly curving inlet to said venturi-shaped passage and maintaining a pre-established diameter of said inlet, and flange means extending from the base of said cylinder and confined tightly upon said shoulder by a wall of said chamber to fix the cylinder in spaced relationship with said chamber, said flange means maintaining a pre-established diameter of the outlet portion thereof; said cylinder having a relatively long body portion intermediate its said inlet and outlet portions and comprehending the throat portion of said venturi-shaped passage, whereby the area of said throat will expand or contract according to the pressure differential between the static head of fluid within said annular space and the velocity head of fluid flowing through said cylinder passage.

4. A flow control device comprising a casing having a base member including a tubular discharge conduit and a shoulder portion extending outwardly about said conduit at its upstream end and a cap member having an inflow conduit and a relatively large diameter sleeve extending concentrically therefrom for securement to said base member to define a static pressure chamber intermediate said inflow and discharge conduits, a tubular flow control element of flexible, rubber-like material disposed wholly within said chamber and being dimensionally related thereto to provide an annular space between the element and the wall of the sleeve, said element having an axial flow passage of venturi shape, flange means at the outlet end of said element for supporting said element on said base member shoulder portion with the axial flow passage in registry with the discharge conduit, said cap member having a counterbore snugly receiving the peripheral portion of said flange means and cooperating with said base member shoulder portion to secure the element within said chamber, and rigid means secured about the inlet of said venturi-shaped passage to maintain a pre-established inlet diameter; the length of the flow control element between the lowermost edge of said rigid means and the top of said flange means being so related to the maximum side wall thickness of the element and to the hardness of the side wall of the element to provide a flexible wall portion radially deformable in response to the pressure differential between the static head of fluid within said chamber and the velocity head of fluid passing through said venturi-shaped passage.

5. A flow control device comprising a casing having a base member including a tubular discharge conduit and a shoulder portion extending outwardly about said conduit at its upstream end and a cap member having an inflow conduit and a relatively large diameter sleeve extending concentrically therefrom for securement to said base member to define a static pressure chamber intermediate said inflow and discharge conduits, a tubular flow control element of elastic material disposed wholly within said chamber and being dimensionally related thereto to provide an annular space between the element and the wall of the sleeve, said element having an axial flow passage of venturi shape, flange means at the outlet end of said element for supporting said element on said base member shoulder portion with the axial flow passage in registry with the discharge conduit, said cap and base members cooperatively engaging said flange means to secure the element within said chamber, and rigid means secured about the inlet of said venturi-shaped passage to maintain a pre-established inlet diameter; the length of the flow control element between the lowermost edge of said rigid means and the top of said flange means being of the order of one and one-half times the maximum side wall thickness of the element and one-half of the overall length of the element to provide a wall portion radially deformable in response to the pressure differential between the static head of fluid within said chamber and the velocity head of fluid passing through said venturi-shaped passage.

References Cited in the file of this patent
UNITED STATES PATENTS

| 225,776 | Wilson | Mar. 3, 1880 |
| 657,007 | Richter | Aug. 28, 1900 |
| 2,444,449 | Kearny | July 6, 1948 |
| 2,515,073 | Binnall et al. | July 11, 1950 |